(12) United States Patent
Ruiz Calavera et al.

(10) Patent No.: US 7,726,608 B2
(45) Date of Patent: Jun. 1, 2010

(54) DEVICE TO REDUCE THE LATERAL FORCE GENERATED BY AERIAL REFUELING BOOM CROSS-SECTION

(75) Inventors: Luis Pablo Ruiz Calavera, Madrid (ES); Francisco Javier Mariscal Sanchez, Madrid (ES)

(73) Assignee: EADS Construcciones Aeronauticas, Madrid (ES)

( * ) Notice: Subject to any disclaimer, the term of this patent is extended or adjusted under 35 U.S.C. 154(b) by 296 days.

(21) Appl. No.: 11/893,107

(22) Filed: Aug. 14, 2007

(65) Prior Publication Data
US 2008/0308679 A1    Dec. 18, 2008

(30) Foreign Application Priority Data
Jun. 15, 2007    (WO) ................ PCT/ES2007/070118

(51) Int. Cl.
*B64D 39/00*    (2006.01)

(52) U.S. Cl. ................................. 244/135 A

(58) Field of Classification Search ............. 244/135 A, 244/135 R, 1 TD, 199.3, 201, 204.1
See application file for complete search history.

(56) References Cited

U.S. PATENT DOCUMENTS

| | | | | |
|---|---|---|---|---|
| 1,613,348 | A * | 1/1927 | Falkenthal | 244/198 |
| 4,231,536 | A * | 11/1980 | Ishimitsu et al. | 244/135 A |
| 6,394,397 | B1 * | 5/2002 | Ngo et al. | 244/199.3 |
| 7,097,139 | B2 * | 8/2006 | Schroeder | 244/135 A |
| 7,404,530 | B2 * | 7/2008 | Saggio et al. | 244/135 A |
| 2005/0236520 | A1 * | 10/2005 | Wukowitz | 244/105 |
| 2006/0075694 | A1 * | 4/2006 | Lin | 52/94 |
| 2007/0084968 | A1 * | 4/2007 | Thal et al. | 244/135 A |

\* cited by examiner

*Primary Examiner*—Tien Dinh
(74) *Attorney, Agent, or Firm*—Ladas and Parry LLP (57) ABSTRACT

Device to reduce the lateral force generated by an aerial refueling boom (11) of an aircraft characterized in that it has at least one plate (31), the plate (31) has two cantilevered wings (32, 33), the wings (32, 33) have perforations (34), so that the wake produced in the boom (11) has a lower dynamic pressure than that of the free stream.

15 Claims, 6 Drawing Sheets

DEVICE TO REDUCE THE LATERAL FORCE GENERATED BY AERIAL REFUELING BOOM CROSS-SECTION

FIELD OF THE INVENTION

The invention relates to a system to perform aerial refueling of aircraft, and in particular to a device to reduce the side force produced by an aircraft refueling boom.

BACKGROUND

One of the procedures currently in use to perform aerial refueling of aircraft involves the use of a cylindrical beam (boom) with a telescopic tube through which fuel is passed from the tanker aircraft to the receiver aircraft. The boom is articulated with two degrees of rotational freedom at the attachment point to the tanker. A pair of independently moving fins (ruddevators) attached to the boom at a distance to the articulation, allow the boom operators to fly the boom, controlling its position in space, to guide the telescopic tube into the receptacle of the receiver.

The boom cross section must be symmetric and have a low drag, so that for a given control force in the ruddevators a large operational flyable envelope can be achieved. This need for a low drag boom section is even more important when the boom is to be capable to refuel large aircraft, as this operation is performed in specific conditions that increase the drag.

The low thickness-low drag airfoils typically used in aeronautics generate a large amount of lateral force (lift) when they are subjected to local sideslip (incident current out of the section plane of symmetry). For the typical applications of these airfoils, this is beneficial, as the requirement is to have the largest lift to drag ratio possible. Nevertheless, for the particular application of the boom at sideslip, this lateral force is detrimental, as it opposes the control force introduced by the ruddervators, thus reducing the operational envelope of the system. This problem is aggravated by the boom flexibility. The lateral force generated by the ruddevators to control de boom twist the boom in the sense to increase the local sideslip, with the corresponding increment of the opposing force generated by the boom and associated reduction of the flyable envelope.

A possible way to solve this problem is to use circular or quasi-circular boom cross-sections, which generate much less lift than an airfoil, but they also produce a much larger drag than an airfoil, with the corresponding impact on the operational envelope.

Another way to address this issue is by the use of thick airfoils (70% thickness ratio for instance) that when at sideslip (due to a turn as rigid solid of the boom around the articulation or due to its elastic deformation) generate negative lift which adds to the ruddevators control force and does not oppose it. This type of airfoils has several disadvantages:

- non-linearities in the lift-incidence relationship, which complicate the control laws design;
- larger drag with the corresponding impact on the operational envelope;
- high sensitivity to variations in section geometry and flight conditions (Mach number, Reynolds number, elevation angle, turbulence) which complicate control and may even induce the loss of the inverse lift effect;
- they are prone to aeroelastic instability problems (divergence, flutter, galloping, etc.).

The present invention comes to solve these drawbacks.

SUMMARY OF THE INVENTION

The present invention relates to a passive device that provides a significant reduction of the lateral force generated by an aerial refueling boom at sideslip even when airfoil sections are used.

For this reason, the device comprises a plate located at the leading edge of the boom airfoil that generates a low dynamic pressure wake around the boom. Alternatively a series of plates can be arranged at different positions along the boom chord.

The plate of the device according to the invention comprises several perforations and has irregular edges to limit its negative effect on drag and to diminish at the same time the possibility of generating flow induced oscillations.

The device according to the invention allows regulation of its effect by modifying its length, width, porosity and number of plates in series used.

Other features and advantages of the present invention will be disclosed in the following detailed description of an illustrative embodiment of its object in relation to the attached figures.

DETAILED DESCRIPTION OF PREFERRED EMBODIMENTS

Figure 1:
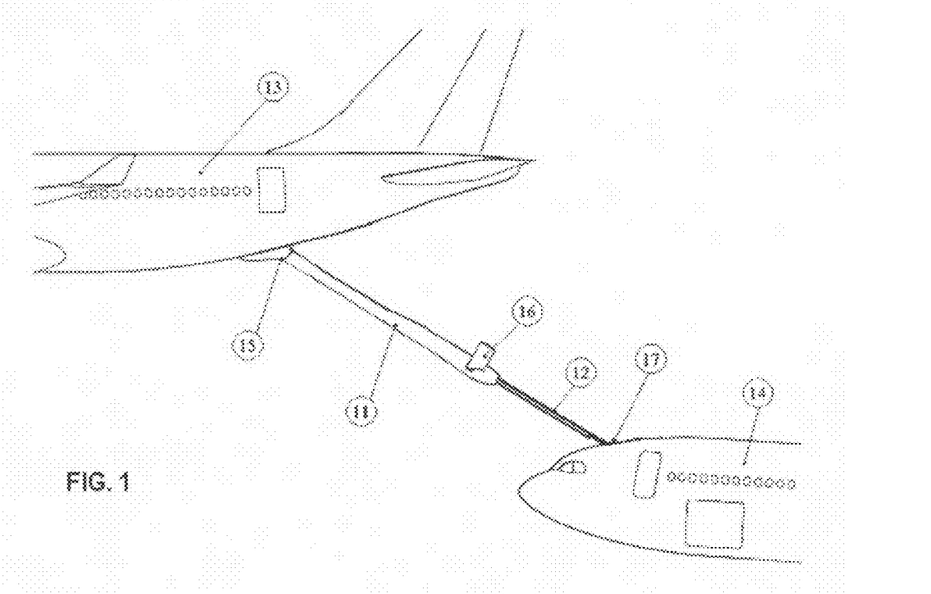
FIG. 1 shows a schematic lateral view of the type of aerial refueling system to which the present invention is applied.
Figures 2A, 2B, 2C:
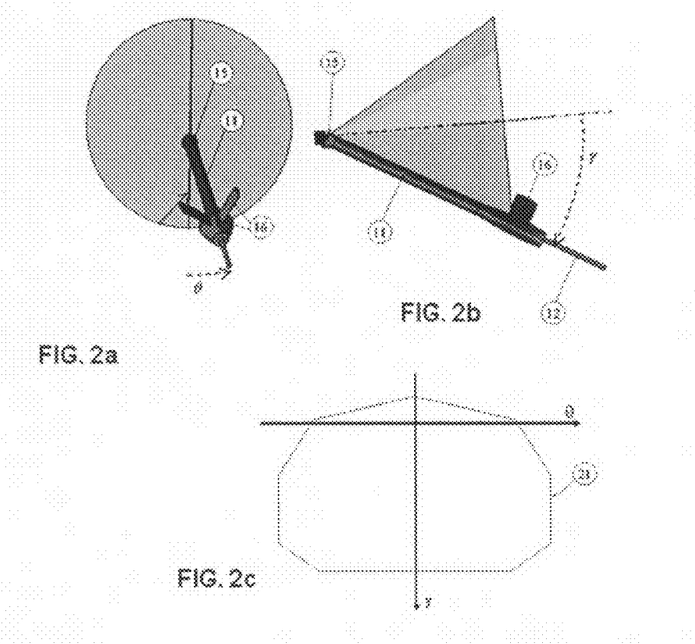
FIGS. 2a and 2b show the definition of the angles that define the position in space of the boom.
FIG. 2c shows an example of the elevation-azimuth/roll envelope of an aerial refueling boom.

One of the procedures currently in use to perform aerial refueling of aircraft involves the use of a cylindrical beam (boom) 11 with a telescopic extension 12, through which fuel is transferred from the tanker aircraft 13 to the receiver aircraft 14, as shown in FIG. 1. The boom 11 has an articulation 15 with two degrees of rotational freedom (elevation-roll or elevation-azimuth) at the attachment point to the tanker 13. A pair of independently moving fins (ruddevators) 16 attached to the boom at the opposite side to the articulation 15, allow the boom operators (not shown), by means of independent variations of the incidence of each fin in respect to the incident current, to fly the boom 11, controlling its position in space, to guide the telescopic tube into the receptacle of the receiver. The flyable envelope 21 is defined by means of two angles, the elevation angle γ and the lateral angle (roll or azimuth) θ, as shown in FIG. 2.

The boom 11 cross section (section perpendicular to its longitudinal axis) must be symmetric to have equal behavior to port and starboard side and introduce a low drag, so that for a maximum given control force in the ruddevators 16 the largest possible operational flyable envelope 21 can be achieved. Alternatively, a low drag reduces the amount of ruddevators 21 deflection needed to achieve a certain elevation angles, thus resulting in additional spare control power to reach higher lateral envelope angles 21. The need for a low drag boom section is even more important when the boom is to be capable to refuel large aircraft, because this operation requires specific conditions:

higher Mach number of flight thicker booms 11 to increase the fuel flow rate longer boom 11 to increase separation between the tanker 13 and the receiver aircraft 14.

All these elements produce an increase in the drag of the boom 11.

The low thickness-low drag airfoils typically used in aeronautics generate a large amount of lateral force (lift) when at incidence (flow not contained in the section symmetry plane). For the typical applications of these airfoils, this is beneficial, as the requirement is to have the largest lift to drag ratio possible. Nevertheless, for the particular application of the boom 11 this lateral force is detrimental, as it opposes the control force introduced by the ruddevators 16, thus reducing the lateral operation (roll or azimuth) of the envelope 21. This problem is aggravated the more flexible the boom 11 is (the flexibility being a consequence by the need to have a light structure). To ease visibility of the receiver receptacle 17 between the boom 11 and the receiver aircraft 14 by the boom operator, ruddevators 16 are typically placed on the upper part of the boom 11. The point of application of their forces is, in consequence, above the boom 11, so that the generation of a lateral control force in the ruddevators 16 generates a twist of the boom 11 in the sense to increase its local sideslip. This results in an increment of the opposing force generated by the boom 11, with the consequent reduction of the control capacity of the ruddevators 16 and the reduction of the flyable envelope 21.

The present invention attempts to solve the drawbacks of the solutions used to solve this problem until now.

Figure 3:
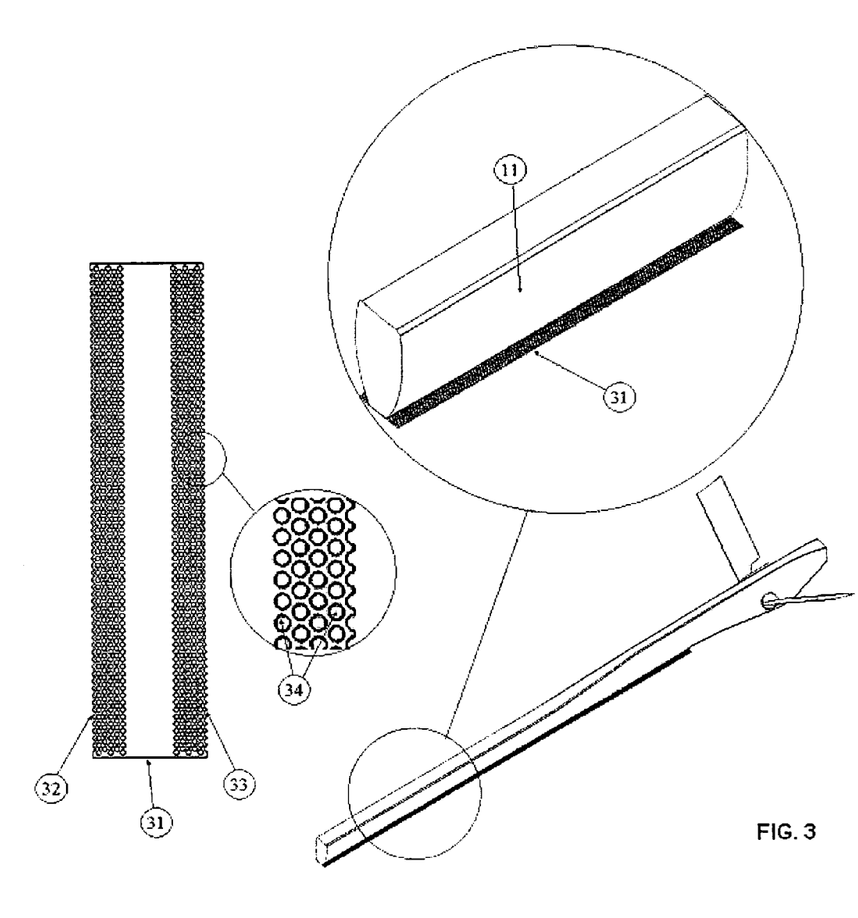
FIG. 3 shows a scheme of the way the device is mounted on the boom and a detailed zoom of the device.

The device according to the invention comprises a plate 31. This plate 31 substitutes the leading edge of the boom section 11, or alternatively is mounted on top of said leading edge of the boom section 11. As shown in FIG. 3, the plate 31 comprises two cantilevered wings 32 and 33, which comprise perforations 34, with a circular shape or with any other shape.

Figure 4:
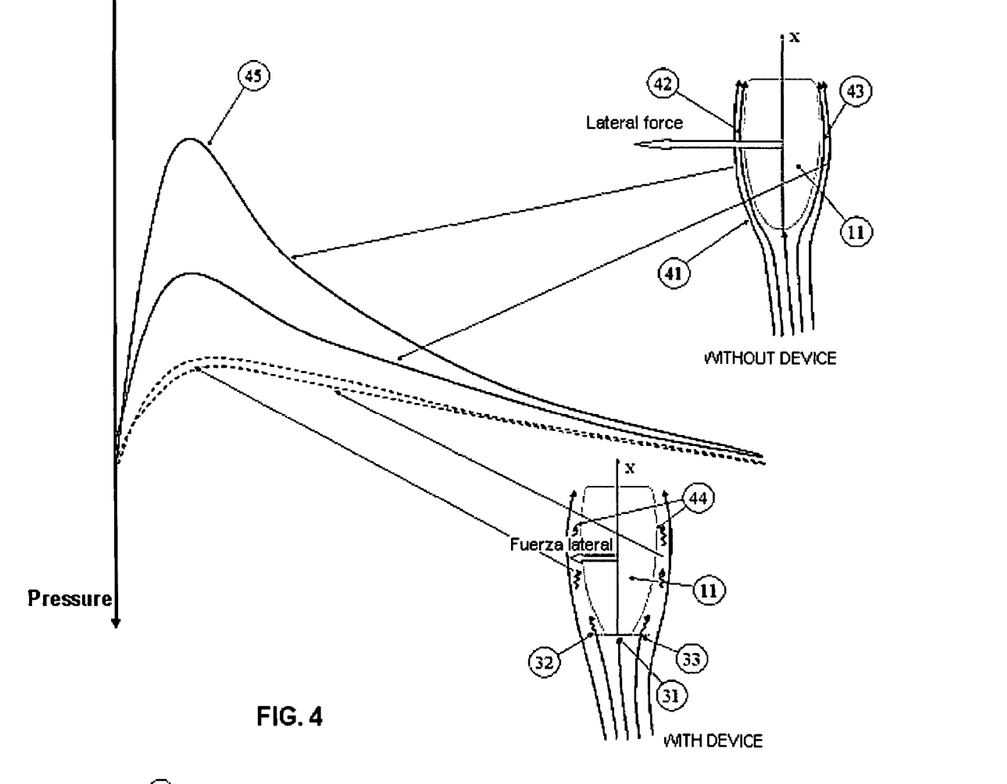
FIG. 4 shows the physical mechanism by which the device reduces the lateral force on the boom.

As depicted in FIG. 4, the plate 31 produces two effects:

avoids the acceleration of the flow on the suction side 41 of the leading edge of the boom section 11, responsible for the generation of the suction peak 45 typical of airfoils; and generates a low dynamic pressure wake 44, which surrounds the boom 11, reducing the lift due to the pressure differences between the suction side 42 and the pressure side 43, located at the central and rear parts of the boom 11 chord.

Figure 5A:
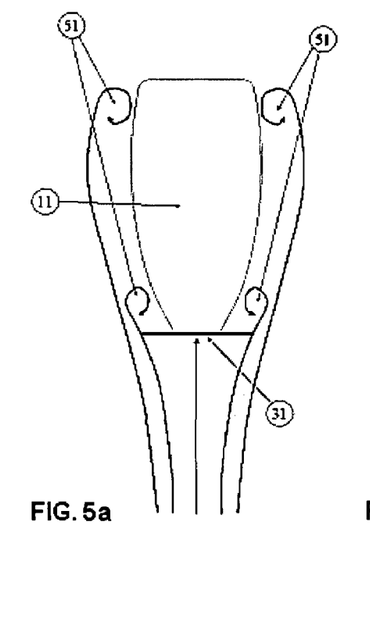
FIGS. 5a and 5b present the physical reason for the use of the perforations on the device.
Figure 5B:
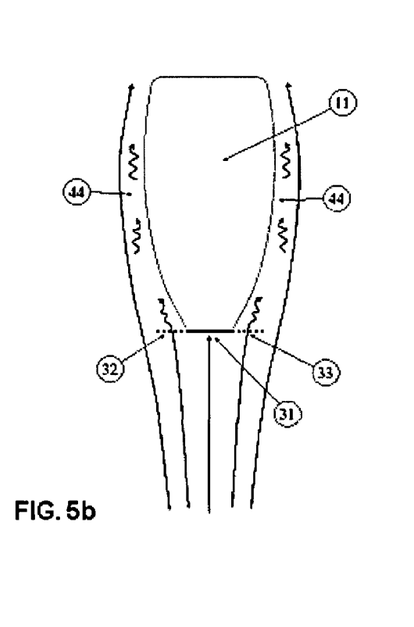

The perforations 34 of the lateral wings 32 and 33 of the plate 31 must have a number and size enough to produce a porosity that avoids excessive blocking of the flow passing through them, so as to produce the following two beneficial features:

reduce the aerodynamic drag introduced by the plate 31; and avoid massive flow separations 51 that might introduce large oscillating forces on the boom section 11, as shown in FIGS. 5a and 5b.

Figures 6A, 6B, 6C:
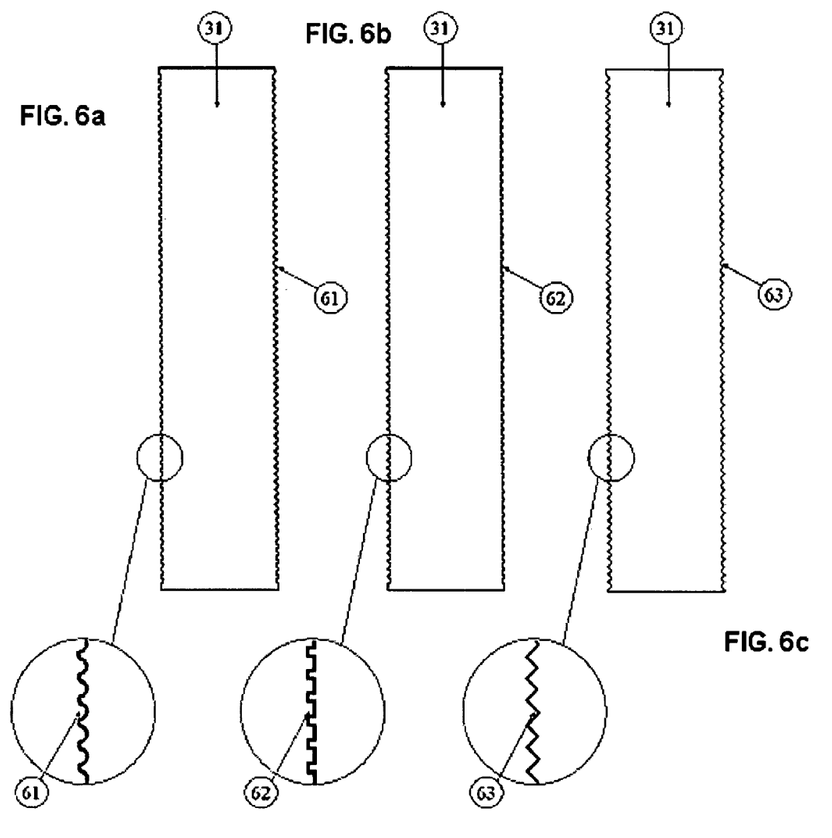
FIGS. 6a, 6b, and 6c show different types of irregular finishing of the device edges.

With the aim to avoid the possibility of large high-energy coherent vortices, the edges of the plate 31 have circular 61, square 62, triangular 63 or similar irregular shapes to help "breaking" this vortices, as respectively shown in FIGS. 6a, 6b, and 6c.

Figure 7:
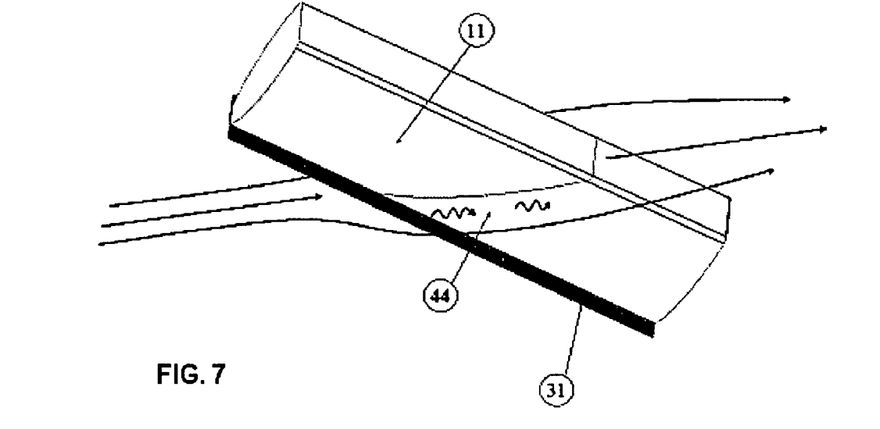
FIG. 7 presents a scheme with the conditions to be taken into account in the selection of the device width.
Figure 8A:
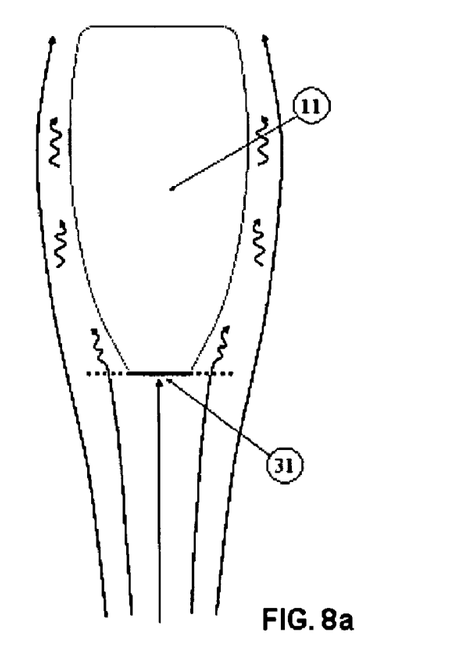
FIGS. 8a and 8b show the physical mechanism by which the same effect can be achieved using either a single, wide plate at the leading edge, or several plates of reduced width placed in series along the chord.
Figure 8B:
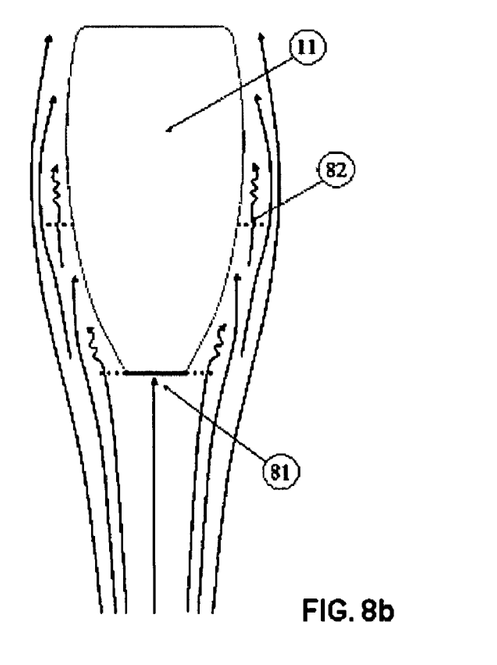

As the extension of the low dynamic pressure wake 44 introduced by the plate 31 increases with the plate 31 width, this width is selected so that this low energy wake 44 completely covers the boom 11 section for all the elevation angles γ of interest, as shown in FIG. 7. Should the resulting width be excessive and limited by any other design consideration, it would be possible to achieve the same effect using two 81,82 or more plates of smaller width placed in series along the chord, so that each one of them actuates on a zone of the boom 11 section as shown in FIGS. 8a and 8b.

Figure 9A:
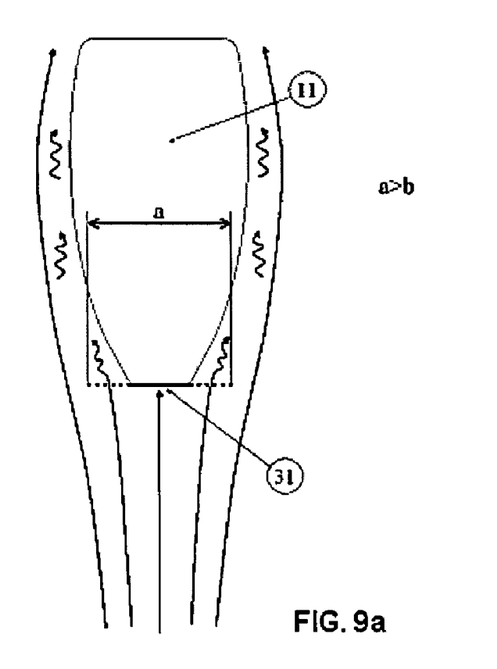
FIGS. 9a and 9b show the physical mechanism that allows regulating the amount of lateral force eliminated as a function of the device width.
Figure 9B:
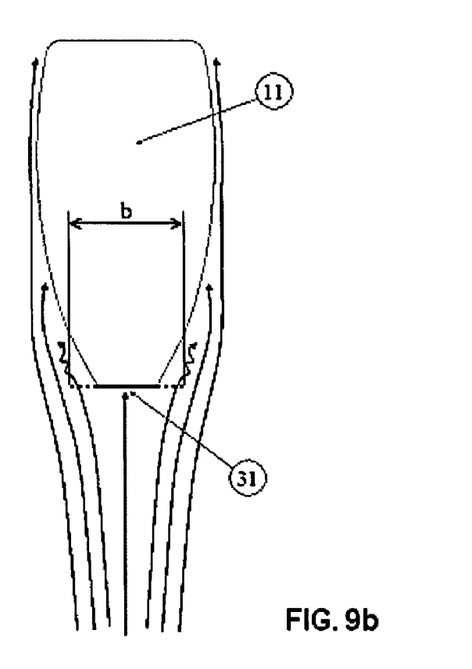

The effect of the plate 31 on the boom lateral force can be modulated in several ways:

varying the length of the boom 11 covered by the device;

varying the plate 31 width so that the wake 44 affects a larger or smaller portion of the boom 11 chord, as previously described and depicted in FIGS. 9a and 9b;

varying the plate 31 porosity 34 to introduce a larger or smaller dynamic pressure loss in the flow that passes through it.

As the plate 31 has relatively sharp edges, its wake has low sensitivity to changes in the flight conditions (Mach number, Reynolds number, boom elevation angle, turbulence) which assures the aerodynamic behavior of the boom 11 with the device of the present invention to be consistent and easy to control.

Figure 10:
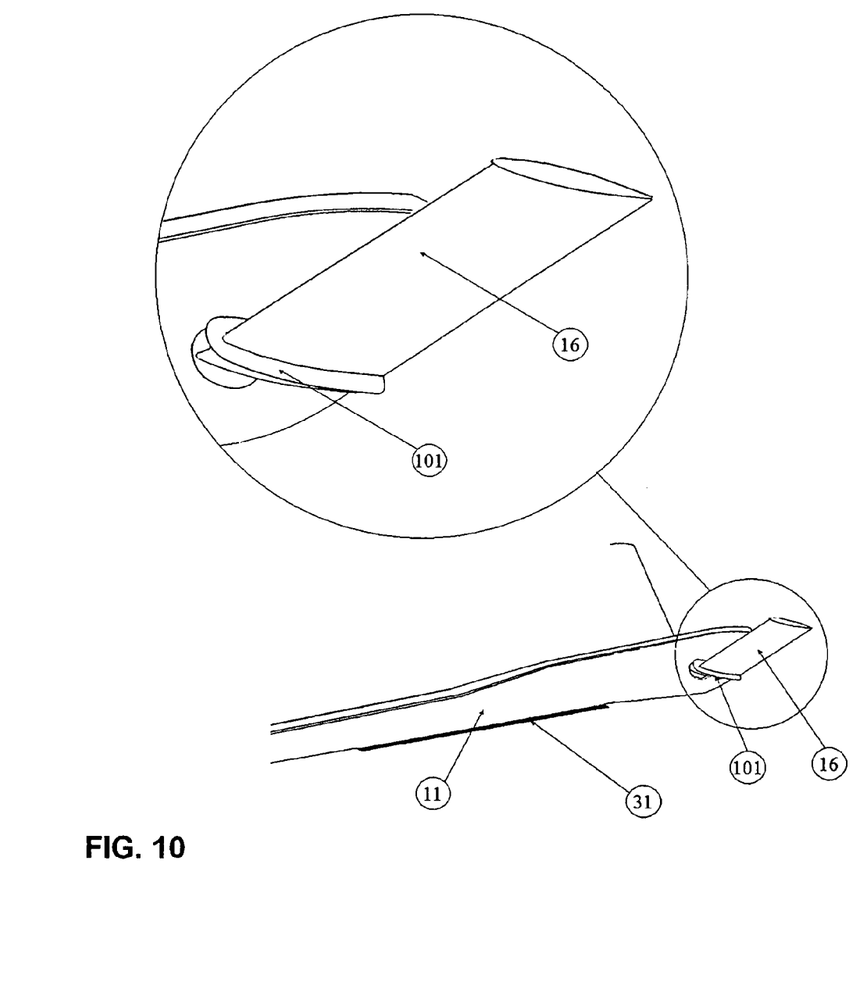
FIG. 10 presents a scheme of the ruddevators used to control the flow of the device according to the invention.

According to another embodiment of the invention, the ruddevators 16 used to control de booms, and which preferably have a dihedral angle of 45° with respect to the boom 11 of the device according to the invention, can have arranged on them some fences 101 that perform the function of flow control as shown in FIG. 10. These control fences 101 are preferably arranged perpendicular to the ruddevators 16, and have a shape that is similar to the airfoil section of said ruddevators 16. The control fences 101 are placed close to the root of the ruddevators 16, from the leading edge to the trailing edge. The control fences 101 are formed by thin plates, from 2 to 6 mm thick. The function of these control fences 101 is to stabilize the device of the aerial refueling in the wing envelope in extreme loading conditions, or maximum sweep, which is the unstabilizer aerodynamic flow, avoiding said sweep or airflow movement to the external part of the ruddevators 16, to shield the ruddevators 16 from the possible negative influences of the wake generated by the plate 31.

Although the present invention has been fully described in connection with preferred embodiments, it is evident that modifications may be introduced within the scope thereof, not considering this as limited by these embodiments, but by the contents of the following claims.

The invention claimed is:

1. Device to reduce the lateral force generated by an aerial refueling boom (11) of an aircraft, said boom having a plane of symmetry incorporating a leading edge characterized in that said device comprises at least one plate (31), said plate (31) comprising two cantilevered wings (32, 33), said wings (32, 33) comprising perforations (34), said plate being oriented perpendicular to the plane of symmetry of said boom so that the wake produced in the boom (11) has a lower dynamic pressure than that of the free stream.

2. Device to reduce the lateral force generated by an aerial refueling boom (11) according to claim 1, characterized in that the plate (31) is located on the leading edge of the boom section (11).

3. Device to reduce the lateral force generated by an aerial refueling boom (11) according to claim 1, characterized in that the plate (31) is located at the leading edge of the boom section (11).

4. Device to reduce the lateral force generated by an aerial refueling boom (11) according to claim 1, characterized in that the perforations (34) have a circular shape.

5. Device to reduce the lateral force generated by an aerial refueling boom (11) according to claim 1, characterized in that the edges of the plate (31) are irregular circular shaped edges (61).

6. Device to reduce the lateral force generated by an aerial refueling boom (11) according to claim 1, characterized in that the edges of the plate (31) are irregular square shaped edges (62).

7. Device to reduce the lateral force generated by an aerial refueling boom (11) according to claim 1, characterized in that the edges of the plate (31) are irregular triangular shaped edges (63).

8. Device to reduce the lateral force generated by an aerial refueling boom (11) according to claim 1, characterized in that said device comprises two plates (81, 82), each one of them being effective to lower dynamic pressure in one area of the boom (11) section.

9. Device to reduce the lateral force generated by an aerial refueling boom (11) according to claim 1, characterized in that said device comprises several plates placed in series, each one of them being effective to lower dynamic pressure in one on one area of the boom (11) section.

10. Device to reduce the lateral force generated by an aerial refueling boom (11) according to claim 1, characterized in that the boom (11) comprises at least one aerodynamic moving ruddevator (16), that allows to control the position in space of the boom (11).

11. Device to reduce the lateral force generated by an aerial refueling boom (11) according to claim 10, characterized in that the ruddevator (16) is arranged at a dihedral angle of 45° with respect to the boom (11).

12. Device to reduce the lateral force generated by an aerial refueling boom (11) according to claim 10, characterized in that said device comprises at least one flow control fence (101) arranged on the ruddevator (16) to stabilize the refueling device in maximum loading conditions.

13. Device to reduce the lateral force generated by an aerial refueling boom (11) according to claim 12, characterized in that the flow control fence (101) is formed by a thin metallic plate.

14. Device to reduce the lateral force generated by an aerial refueling boom (11) according to claim 13, characterized in that the flow control fence (101) has a thickness of 2 to 6 mm.

15. Device to reduce the lateral force generated by an aerial refueling boom (11) according to claim 12 characterized in that the flow control fence (101) is arranged perpendicular to the ruddevator (16).

\* \* \* \* \*

UNITED STATES PATENT AND TRADEMARK OFFICE
CERTIFICATE OF CORRECTION

PATENT NO.       : 7,726,608 B2                                Page 1 of 1
APPLICATION NO. : 11/893107
DATED            : June 1, 2010
INVENTOR(S)      : Luis Pablo Ruiz Calavera et al.

It is certified that error appears in the above-identified patent and that said Letters Patent is hereby corrected as shown below:

Title page, item (73), assignee name: after "Aeronauticas" insert --S.A.--.

Signed and Sealed this

Fifth Day of October, 2010

David J. Kappos
*Director of the United States Patent and Trademark Office*